(12) United States Patent
Farag et al.

(10) Patent No.: US 8,665,217 B2
(45) Date of Patent: *Mar. 4, 2014

(54) MULTI-BUTTON MOUSE

(75) Inventors: Abraham Farag, East Palo Alto, CA (US); Brian Q. Huppi, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/549,212

(22) Filed: Jul. 13, 2012

(65) Prior Publication Data

US 2013/0063354 A1 Mar. 14, 2013

Related U.S. Application Data

(63) Continuation of application No. 12/429,887, filed on Apr. 24, 2009, now Pat. No. 8,243,018, which is a continuation of application No. 11/748,273, filed on May 14, 2007, now Pat. No. 7,535,458, which is a continuation of application No. 10/209,537, filed on Jul. 30, 2002, now Pat. No. 7,233,318.

(60) Provisional application No. 60/364,400, filed on Mar. 13, 2002.

(51) Int. Cl.
*G09G 5/08* (2006.01)

(52) U.S. Cl.
USPC .............................. 345/163; 345/156; 463/37

(58) Field of Classification Search
USPC ......... 345/156, 157, 163–166; D14/402–410; 463/37, 38
See application file for complete search history.

(56) References Cited

U.S. PATENT DOCUMENTS

| | | | |
|---|---|---|---|
| 6,348,912 B1 * | 2/2002 | Smith | 345/163 |
| 6,373,470 B1 * | 4/2002 | Andre et al. | 345/166 |
| 6,507,338 B1 * | 1/2003 | Liao et al. | 345/173 |
| 6,795,057 B2 * | 9/2004 | Gordon | 345/163 |
| 6,844,872 B1 * | 1/2005 | Farag et al. | 345/163 |
| 7,233,318 B1 * | 6/2007 | Farag et al. | 345/163 |
| 7,535,458 B2 * | 5/2009 | Farag et al. | 345/163 |
| 8,243,018 B2 * | 8/2012 | Farag et al. | 345/163 |
| 2002/0140676 A1 * | 10/2002 | Kao | 345/163 |

* cited by examiner

*Primary Examiner* — Tom Sheng
(74) *Attorney, Agent, or Firm* — Brownstein Hyatt Farber Schreck, LLP

(57) ABSTRACT

A mouse with multi button functionality is disclosed. The mouse includes a housing that surrounds the internal components of the mouse. The housing includes at least a first member and a second member, each of which forms a substantial portion of the housing. The first member moves relative to the second member so as to implement at least one of the multiple button functions of the mouse.

20 Claims, 11 Drawing Sheets

MULTI-BUTTON MOUSE

CROSS REFERENCE TO RELATED APPLICATIONS

This application is a continuation of U.S. patent application Ser. No. 12/429,887 filed on Apr. 24, 2009 and entitled "MULTI-BUTTON MOUSE," which is a continuation of U.S. patent application Ser. No. 11/748,273 filed on May 14, 2007 and entitled "MULTI-BUTTON MOUSE," which is a continuation of U.S. patent application Ser. No. 10/209,537 filed on Jul. 30, 2002 and entitled "MULTI-BUTTON MOUSE," now U.S. Pat. No. 7,233,318 issued Jun. 19, 2007, which claims priority of U.S. Provisional Patent Application No. 60/364,400 filed on Mar. 13, 2002 and entitled "MULTI-BUTTON MOUSE," all of which are hereby incorporated herein by reference.

BACKGROUND OF THE INVENTION

1. Field of the Invention

The present invention relates generally to input devices. More particularly, the present invention relates to mice having multiple button functionality.

2. Description of the Related Art

Most computer systems, as for example general purpose computers such as portable computers and desktop computers, receive input from a user via an input device such as a mouse. As is generally well known, the mouse allows a user to move an input pointer (e.g., cursor) and to make selections with respect to a graphical user interface (GUI). The mouse generally includes a trackball, which is located on the underside of the mouse and which rolls when the mouse moves thus translating the motion of the users hand into signals that the computer system can use. The movement of the trackball generally corresponds to the movement of the input pointer. That is, by positioning the mouse on a desktop and moving it thereon, the user can move the input pointer in similar directions with respect to the GUI. An optical sensor may alternatively be used to track the movement of the mouse. The mouse also conventionally includes one or more buttons, which are located on the top side of the mouse housing. These one or more buttons, when selected, can initiate a GUI action such as menu or object selections. The one or more buttons are typically provided by one or more button caps that move relative to the mouse housing.

Although mice designs such as these work well, there are continuing efforts to improve their form, feel and functionality.

SUMMARY OF THE INVENTION

This invention relates in one embodiment to a method of sending signals corresponding to multiple button functionalities from a unibody mouse to an electronic system. The unibody mouse has a single movable housing component that cooperates with and is movably coupled with a base housing component that supports the unibody mouse on a surface. The method is performed by at least the following: associating the multiple button functionalities with specific portions of the single movable housing component, activating each of the multiple button functionalities by moving the single movable housing component to different positions relative to the base housing component wherein the single movable housing component has at least two degrees of freedom relative to the base housing component, generating a clicking action by moving the movable housing component relative to the base housing component along at least one of the at least two degrees of freedom, and sending a signal to the electronic system based upon the clicking action.

This invention relates in one embodiment to a method of configuring a multi-function mouse having a single movable housing component being movably coupled to an associated base housing component that supports the multi-function mouse on a surface. The method includes at least the following operations: assigning a number of distinct button zones to the single movable housing component, interpreting a signal received from each assigned button zone as a corresponding button function, and performing the button function corresponding to the signal received from the mouse.

This invention relates in one embodiment to computer program product executable by a processor for configuring a multi-function mouse having a single movable housing component being movably coupled to an associated base housing component that supports the multi-function mouse on a surface. The computer program product includes computer code for assigning a number of distinct button zones to the single movable housing component, computer code for interpreting a signal received from each assigned button zone as a corresponding button function, computer code for performing the button function corresponding to the signal received from the mouse, and computer readable medium for storing the computer code.

In yet another embodiment of the invention, software encoded in one or more computer readable media in an electronic system is disclosed. When executed the software operates to assign a number of distinct button zones to a single movable housing component of a user input device communicatively coupled with the electronic system, the single movable housing component being movably coupled to an associated base housing component that supports the user input device on a surface, the single movable housing component being capable of movement along at least two degrees of freedom relative to the base housing component, associate a button function with each assigned button zone, interpret a signal received from the user input device, the signal being produced in the user input device and transmitted to the electronic system as a result of actuating a button zone, the button zone being actuated as a result of moving the single movable housing component relative to the base housing component to actuate an associated movement indicator configured to sense a movement of the associated button zone, wherein interpreting the signal involves at least determining which button zone was actuated, and implement a specific button function corresponding to the associated actuated button zone, the button function corresponding to an action on a display.

Another embodiment of the invention describes a method of configuring a multi-function mouse having a single movable housing component being movably coupled to an associated base housing component that supports the multi-function mouse on a surface, the method is carried out by performing at least the following operations: assigning a number of distinct button zones to the single movable housing component, interpreting a signal received from each assigned button zone as a corresponding button function, and performing the button function corresponding to the signal received from the mouse.

A system is described that includes a unibody user input device having multiple assigned button zones in a single movable housing component of the user input device, wherein each button zone has an associated button functionality and all of said multiple button functionalities are incorporated into the single movable housing component, the single movable housing component being movably coupled to a base housing component that supports the mouse along a surface, wherein the movable housing component is capable of movement along at least two degrees of freedom relative to the base housing component, wherein actuation of a single button zone is achieved by moving the movable housing component relative to the base housing component to actuate an associated movement indicator configured to sense a movement of the associated button zone, a display, and a processor communicatively coupled with the mouse, the processor configured to interpret a signal received from the user input device, the signal being produced in the user input device as a result of the actuation of a button zone, wherein the interpretation of the signal involves at least the determination of which button zone was actuated, the processor being further configured to implement a specific button function corresponding to the associated actuated button zone, the button function corresponding to an action on the display.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

Embodiments of the invention are discussed below with reference to FIGS. 1-15. However, those skilled in the art will readily appreciate that the detailed description given herein with respect to these figures is for explanatory purposes as the invention extends beyond these limited embodiments.

Figure 1:
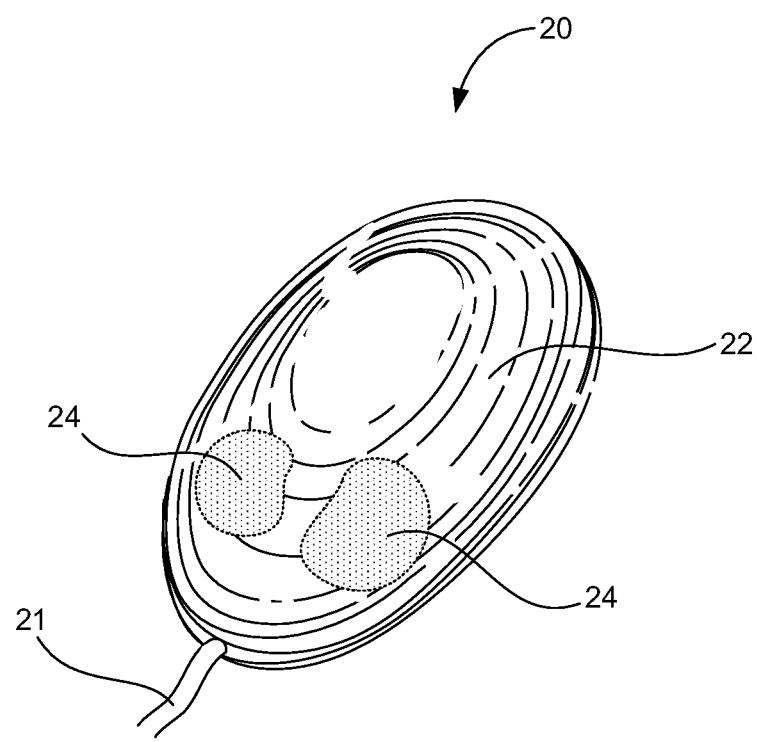
FIG. 1 is a perspective diagram of an input device, in accordance with one embodiment of the present invention.

FIG. 1 is a perspective diagram of a user operated input device 20, in accordance with one embodiment of the invention. The user operated input device 20 is configured to allow a user to move an input pointer (e.g., cursor) and to perform an action on a display screen. By way of example, the input pointer may be displayed via a Graphical User Interface (GUI) on a display screen. Although not shown in FIG. 1, the display screen is typically part of an electronic system such as a computer system. For example, the computer-based electronic system may correspond to a general purpose computer, such as a desktop computer or a portable computer. The user input device is typically connected to the electronic device via a data transmission cord 21, although other types of connections may be used, as for example, wireless connections.

The input device 20 generally includes a device housing 22 that provides a structure for moving the device 20 along a surface and for gripping the device 20 for movement thereof. The device housing 22 also helps to define the shape or form of the device 20. That is, the contour of the device housing 22 embodies the outward physical appearance of the device 20. The device housing 22 also provides a structure for enclosing, containing and/or supporting the internal components of the device 20. Although not shown, the internal components may correspond to electrical and/or mechanical components for operating the device 20. For example, the internal components may include a track ball or optical assembly for monitoring the movement of the input device 20 along a surface and for sending signals corresponding to the movements to the electronic system. In most cases, the signals produced by these components direct the input pointer to move on the display screen in a direction similar to the direction of the device as it is moved across a surface. For example, when the input device is moved forward or backwards, the input pointer is moved vertically up or down, respectively, on the display screen. In addition, when the input device is moved from side to side, the input pointer is moved from side to side on the display screen.

In one embodiment, the user operated input device includes one or more button zones 24. The button zones 24 represent regions of the device 20 that may be actuated by a user to implement one or more button functions associated with performing actions on a display screen. By way of example, the button functions may include selecting an item on the screen, opening a file or document, executing instructions, starting a program, viewing a menu, and/or the like. The button functions may also include functions that make it easier to navigate through the electronic system, as for example, zoom, scroll, open different menus, home the input pointer, perform keyboard related actions such as enter, delete, insert, page up/down, and the like.

The manner in which the button zones 24 may be implemented can be widely varied. For example, the button zones 24 may be provided by a mechanical button (or buttons) that each provide a clicking action for implementing an on-screen action. In most cases, the mechanical button includes a button cap or scroll wheel that works independent of or moves relative to the input device housing 22. For example, the button cap may pivot relative to the housing. The button zones may also be provided by a unified button/housing that incorporates the functionality of a button (or buttons) directly into the input device housing 22, i.e., the button functionality and a substantial portion of the housing are combined (as opposed to attaching separate button caps to or through the device housing). In a unified button housing, the button zones may be provided by different portions of the device housing that each provide a clicking action for implementing an on-screen action. In essence, the device housing serves as a button (or buttons) of the input device 20. The button zones may also be provided by a combination of the above (e.g., button caps and unified button housing).

In any of the examples above, the clicking actions are generally arranged to actuate one or more movement indicators (not shown) contained inside the device housing 22. The movement indicators are configured to sense movements of the button zones during the clicking action and to send signals corresponding to the movements to the electronic system. By way of example, the movement indicators may be switches, sensors and/or the like.

The clicking action(s) may, for example, be used to implement a single click, a double click and/or a dragging and dropping function. As is generally well known, a single click often selects an item on the screen, a double click often opens a document or launches a program, and dragging and dropping generally makes it easy to move an item on the screen. In order to perform a single click using the device 20, the user presses and releases at least one of the button zones 24. In order to perform a double click using the device 20, the user quickly presses and releases at least one of the button zones 24 twice. In order to perform a drag and drop function, the user first positions the pointer or cursor over an item on the screen (by moving the mouse along the flat surface) and presses and holds down at least one of the button zones 24 so as to select the item. Thereafter, the user, while still holding down the at least one of the button zones 24, moves the pointer to a desired position on the screen (by moving the mouse along the flat surface) and subsequently releases the at least one of the button zones 24.

In order to implement multiple button functionalities, the input device 20 is generally divided into several independent and spatially distinct button zones, as for example, button zones 24A and 24B. Each of these button zones may correspond to a distinct button function. For example, the first button zone 24A may correspond to selecting an item on the display screen (e.g., standard left click) and the second button zone 24B may correspond to showing a menu on the display screen (e.g., standard right click).

In one embodiment, the input device 20 integrates at least one of the button zones 24A or 24B directly into a portion of the device housing 22. That is, the device housing 22 acts like a button such that at least one of the multiple button functionalities may be implemented by pressing on the device housing 22 rather than on a separate mechanical button. The other button zone 24A or 24B may correspond to another portion of the device housing 22 as above, or to a mechanical button such as button caps, scroll wheels and the like. In the illustrated embodiment, the button zones 24 correspond to different portions of the device housing 22 and thus the device housing itself is used to implement all of the multiple button functions of the input device. Although only two button zones are shown in FIG. 1, the input device may include one or more button zones.

Figure 2:
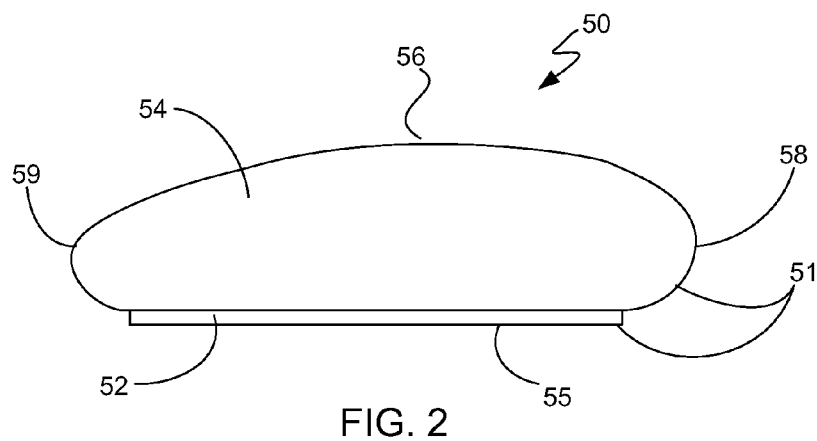
FIG. 2 is a simplified side view of a unibody mouse, in accordance with one embodiment of the present invention.

FIG. 2 is a side view of a unibody mouse 50, in accordance with one embodiment of the invention. By way of example, the unibody mouse 50 may correspond to the user operated input device 20 shown in FIG. 1. The unibody mouse 50 generally includes a mouse housing 51 that provides a structure for moving the mouse along a surface, for gripping the mouse for movement thereof and for implementing at least one button function of the mouse 50. The term "unibody" herein refers to a mouse that integrates at least one button function directly into the mouse housing 51, i.e., pressing on the mouse housing 51 creates a clicking action. As such, any part of the hand, from finger to thumb to palm, can trigger a clicking action.

The mouse housing 51 may be widely varied. In the illustrated embodiment, the mouse housing 51 includes a movable base 52 and a button body 54. The movable base 52 is configured to moveably support the mouse 50 during use thereof, i.e., the base 52 makes moving contact with a surface such as a desktop or mouse pad. In most cases, the movable base 52 supports a position detecting mechanism so as to track the position of the mouse 50 as it is moved along the surface. By way of example the position detecting mechanism may be a trackball mechanism or an optical sensor. The position detecting mechanism is generally configured to provide information to a computer so that the movement of the pointer on the screen corresponds to the movement of the mouse on the surface.

The button body 54, on the other hand, is configured to move relative to the base 52 so as to provide a clicking action that implements the button functionality of the mouse 50. The entire surface of the body 54 above the base 52 acts as a single or multiple button. The clicking action (e.g., the movement of the body 54 relative to the base 52) may be provided through one or more degrees of freedom (DOF). The degrees of freedom may be implemented through one or more rotations, pivots, translations, flexes (and/or the like) relative to the base 52. By way of example, the button body 54 may be coupled to the base 52 via one or more pin joints, slider joints, ball and socket joints, flexure joints and the like.

Figure 3:
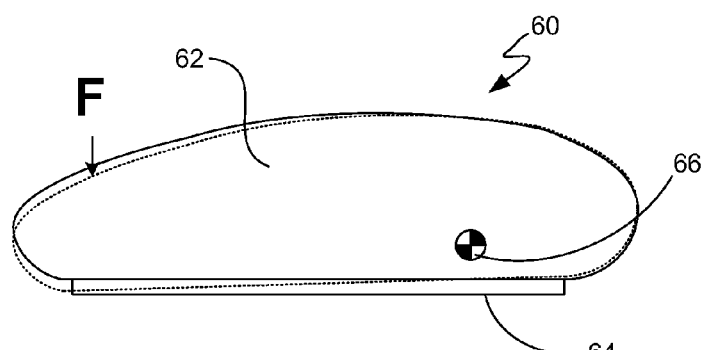
FIG. 3 is a simplified side view of a unibody mouse, in accordance with one embodiment of the present invention.

In one embodiment, a single DOF is used to implement a single clicking action. For example, as shown in FIG. 3, a single clicking action may be implemented by a body 62 that pivots relative to a base 64. By way of example, the body 62 and base 64 may generally correspond to the body and base shown in FIG. 2. The body 62 typically pivots about an axis 66. In this example, the body 62 is capable of moving between a first position (shown by a solid line) and a second position (shown by a dotted line) when a force F is applied to the body 62. The force F may be any downward force on the mouse 60, whether from a finger, palm or hand that results in a clicking action. In one implementation, the button body 62 may be spring biased so as to place the button body 62 in an unactuated position such as for example the first position shown by the solid lines. The spring bias may be provided by a separate spring or a movement indicator that includes a spring action.

Figures 4A, 4B:
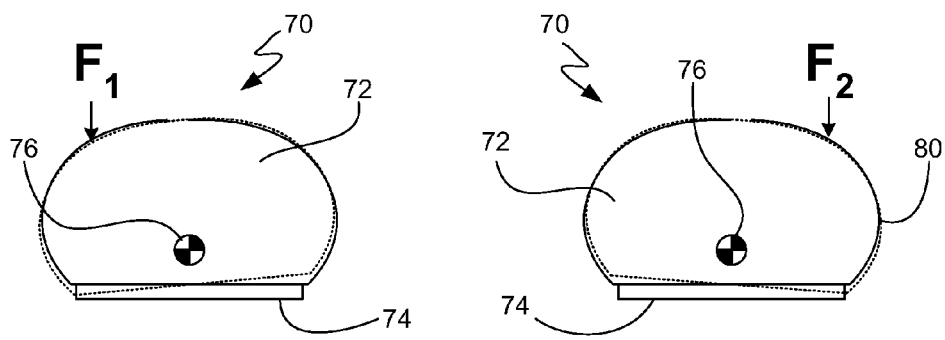
FIGS. 4A-4B are simplified rear views of a unibody mouse, in accordance with one embodiment of the present invention.

In another embodiment, a single DOF is used to implement multiple clicking actions. For example, as shown in FIGS. 4A and 4B, a multiple clicking action may be implemented by a body 72 that pivots relative to a base 74. By way of example, the body 72 and base 74 may generally correspond to the body and base shown in FIG. 2. The body 72 typically pivots about an axis 76. As shown in FIG. 4A, the body 72 is capable of moving between a first position (shown by a solid line) and a second position (shown by dotted lines) when a force $F_1$ is applied to a left side 78 of the body 72, and as shown in FIG. 4B, the body 72 is capable of moving between a first position (shown by a solid line) and a third position (shown by dotted lines) when a force $F_2$ is applied to a right side 80 of the body 72. The forces $F_1$ and $F_2$ may be any downward force on the mouse 70, whether from a finger, palm or hand that results in a clicking action. In one implementation, the button body 72 may be spring biased so as to place the button body 72 in an unactuated position such as for example the first position shown by the solid lines. The spring bias may be provided by a separate spring or a movement indicator that includes a spring action.

Figure 5:
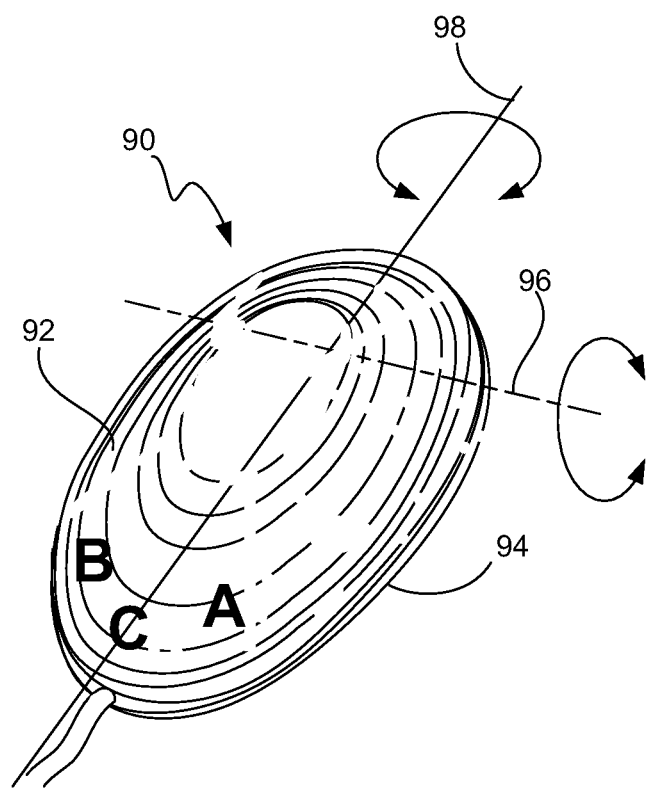
FIG. 5 is a perspective view of a unibody mouse, in accordance with one embodiment of the present invention.

In yet another embodiment, multiple DOF's are used to implement multiple clicking actions. For example, a multiple clicking action may be implemented by a combination of pivots, as for example the pivots shown in FIGS. 3 and 4. Referring to FIG. 5, a unibody mouse 90 that includes a body 92 that pivots in two directions relative to a base 94 is shown. By way of example, the body 92 and base 94 may generally correspond to the body and base shown in FIG. 4. The pivots may be implemented using a variety of joints including pivot joints, flexure joints and the like. As shown by the arrows, the body 92 can pivot about a first axis 96 and a second axis 98. The positions of the two axis 96, 98 may be widely varied so as to allow a plurality of body positions relative to the base. In the illustrated embodiment, the two axes 96, 98 are orthogonal (or perpendicular) to one another. This arrangement allows the body to move between a plurality of positions when a force is applied to different portions of the body 92. For example, the body 72 may be capable of moving between an initial position (no pivot) and a left tilt position (pivot about both axis) when a force is applied to a left front portion A of the body 72, between an initial position and a right tilt position (pivot about both axis) when a force is applied to a right front portion B of the body 72, and between an initial position and a middle tilt position (pivot about a single axis) when a force is applied to a middle front portion C of the body 72. The force may be any downward force on the mouse 90, whether from a finger, palm or hand that results in a clicking action. In one implementation, the button body 92 may be spring biased so as to place the button body 92 in an unactuated position such as for example the first position shown by the solid lines. The spring bias may be provided by a separate spring or a movement indicator that includes a spring action.

It should be noted that pivots are not a limitation and that other types of DOF, as well as other types of joints may be used. For example, the mouse may include a pivot/translating joint, pivot/flexure joint, pivot/ball and socket joint, translating/flexure joint, a flexure joint, a ball and socket joint, and the like so as to provide two or more degrees of freedom.

Multiple clicking actions may be arranged in a variety of ways to produce one or more button zones corresponding to one or more button functions. Button zones, as used in conjunction with a unibody design, refers to a region of the housing that represents a particular button function. The multiple clicking actions may or may not represent multiple button zones. That is, although the body moves to more than one position, the mouse may be configured to have only one button zone or it may be configured to have two or more button zones.

In one embodiment, the number of clicking actions corresponds to the number of button zones. That is, each independent movement of the body relative to the base implements a distinct button function. In a specific example, the mouse shown in FIGS. 4A and 4B, which can tilt to the left or the right may be used to implement different button functions such as a conventional right click and left click.

In another embodiment, the number of clicking actions corresponds to a different number of button zones. For example, a single button zone may be arranged to encompass two or more clicking actions so that each of the clicking actions implements the same button function. In a specific example, the mouse shown in FIG. 5, which can tilt to the left, right and forward may be used to implement only two button functions such as a conventional right click and left click. In cases such as this, the forward tilt may be combined with the right tilt to produce a button zone associated with a right click or with the left tilt to produce a button zone associated with a left click.

The distribution of the button zones may be widely varied. For example, the button zones may be positioned almost anywhere on the mouse (e.g., front, back, sides or the like). Further, the button zones may be formed from almost any shape whether simple (e.g., squares, circles, ovals, triangles, rectangles, polygons, and the like) or complex (e.g., random shapes). The shape of multiple button zones may have identical shapes or they may have different shapes. In addition, the size of the button zones may vary according to the specific needs of each device. In most cases, the size of the button zones corresponds to a size that allows them to be easily manipulated by a user (e.g., the size of a finger tip or larger). Moreover, any number of button zones may be used. In most cases, the number of button zones correspond to the number of button functionalities offered by the mouse 50.

Still referring to FIG. 2, the movable base 52 and button body 54 provide a mouse housing for containing the electronics that generate control signals associated with moving the input pointer and performing actions on a display screen. By way of example, the electronics may be printed circuit boards (PCB), processors, encoders, movement indicators, wires, and the like. The base 52 and body 54 may also define the shape or form of the mouse 50. That is, the contour of the base 52 and body 54 may embody the outward physical appearance of the mouse 50. The contour may be rectilinear, curvilinear or both. In the illustrated embodiment, a bottom side 55 of the base 52 has an external contour (e.g., rectilinear) that substantially conforms to the contour of a flat surface such as a desktop and a top side of the mouse housing has an external contour that substantially conforms to the contour of the inside surface of a hand (e.g., curved). For example, as shown in FIG. 2, a back portion 58 of the body 54 has an external contour (e.g., curved) that is configured to substantially conform to the contour of the palm-side surface of a hand, and a front portion 59 of the body 54 has an external contour (e.g., curved) that is configured to substantially conform to the contour of the fingers of the hand when the palm side surface of the hand is placed on the back portion 58 of the body 54. As shown, the button body represents a substantial portion of the entire mouse housing.

In one embodiment, the button functions of the button zones are implemented via movement indicators located inside the mouse housing and underneath the button zones. The movement indicators may be any combination of switches and sensors. Switches are generally configured to provide pulsed or binary data such as activate (on) or deactivate (off). By way of example, an underside portion of the body may be configured to contact or engage (and thus activate) a switch when the user presses on the button zone. The sensors, on the other hand, are generally configured to provide continuous or analog data. By way of example, the sensor may be configured to measure the position or the amount of tilt of the body relative to the base when a user presses on the button zone.

The arrangement of movement indicators may be widely varied. In one embodiment, the mouse 50 may include a movement indicator for each button zone. That is, there may be a movement indicator corresponding to every button zone. For example, if there are two button zones, then there will be two movement indicators.

In another embodiment, the movement indicators may be arranged in a manner that simulates the existence of a movement indicator for each button zone. For example, two movement indicators may be used to form three button zones. In another embodiment, the movement indicators may be configured to form larger or smaller button zones. By way of example, this may be accomplished by careful positioning of the movement indicators or by using more than one movement indicator for each button zone. It should be noted that the above embodiments are not a limitation and that the arrangement of movement indicators may vary according to the specific needs of each device.

FIGS. 6A-6F are top views of a unibody mouse 30 having a plurality button zones 32 integrated into a housing 34 of the unibody mouse 30, in accordance with several embodiments of the invention. As shown, the dotted lines represent areas of the housing 34 that make up an individual button zone, i.e., an area of the housing that operates as a separate button. By way of example, the unibody mice 30 shown in FIGS. 6A-6F may generally correspond to the user operated input device 20 shown in FIG. 1 or the mouse 50 shown in FIG. 2. Each of the Figures is arranged to show various distributions of the button zones.

Figures 6A, 6B:
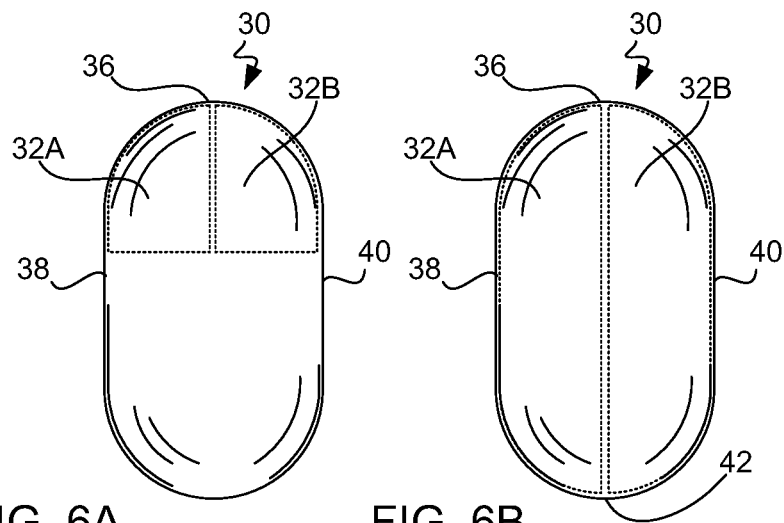
FIGS. 6A-6F are top views of a unibody mouse, in accordance with several embodiments of the present invention.

In FIG. 6A, the unibody mouse 30 includes a pair of button zones 32 that are positioned in the front 36 of the unibody mouse 30. In this example, one of the button zones 32A is positioned on the left side 38 of the unibody mouse 30 and one of the button zones 32B is positioned on the right side 40 of the unibody mouse 30. Furthermore, the button zones 32 are symmetrical, i.e., they are mirror images of each other and therefore they have the same size and shape.

In FIG. 6B, the unibody mouse 30 includes a pair of button zones 32A and 32B that are positioned to the sides 38, 40 of the unibody mouse 30. In this example, the button zones 32 extend from the front 36 of the mouse 30 to the back 42 of the mouse 30. Similar to FIG. 2A, the button zones 32 are symmetrical, i.e., they are mirror images of each other and therefore they have the same size and shape.

Figures 6C, 6D:
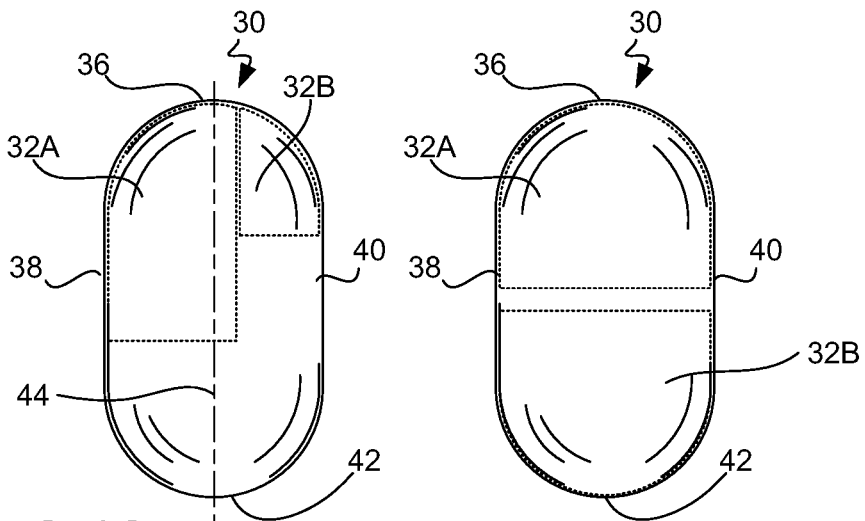

In FIG. 6C, the unibody mouse 30 includes a pair of button zones 32A and 32B that are not symmetrical, i.e., they have different sizes and shapes. In this example, one of the button zones 32 extends over an imaginary centerline 44 that divides the mouse 30 in half.

In FIG. 6D, the unibody mouse 30 includes a pair of button zones 32A and 32B that are positioned in the front 36 and back 42 of the unibody mouse 30. In this example, each of the button zones 32 extends from one side 38 to the opposite side 40 of the mouse 30. Furthermore, each of the button zones 32 are symmetrical, i.e., they are mirror images of each other and therefore they have the same size and shape.

Figures 6E, 6F:
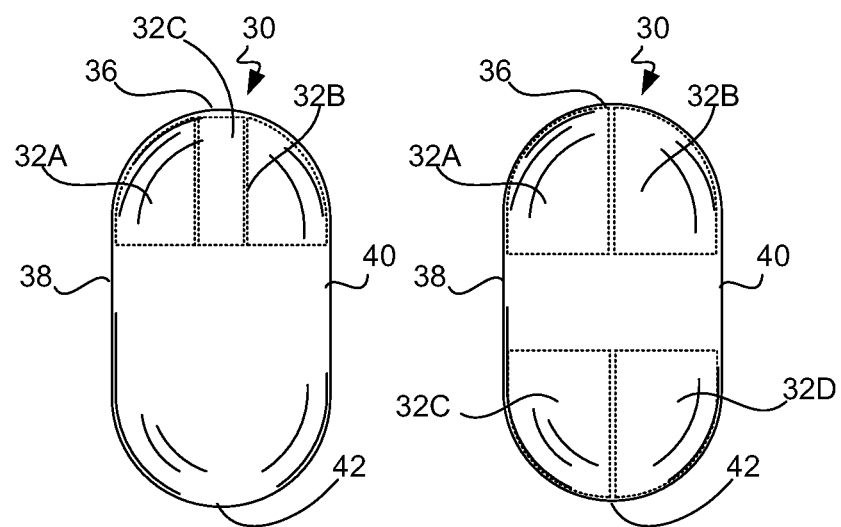

In FIG. 6E, the unibody mouse 30 includes three button zones 32A-32C that are positioned in the front 36 of the unibody mouse 30. In this example, one of the button zones 32A is positioned on the left side 38 of the mouse, one of the button zones 32C is positioned in the center 44 of the mouse 30, and one of the button zones 32B is positioned on the right side 40 of the mouse 30. Furthermore, the button zones 32 are not symmetrical, i.e., they are not mirror images of each other and therefore they have different sizes and shapes.

In FIG. 6F, the unibody mouse 30 includes four button zones 32A-32D that are positioned in the four corners of the unibody mouse 30. In this example, the button zones 32 are symmetrical, i.e., they are mirror images of each other and therefore they have the same size and shape.

It should be noted that the button zone distributions shown in FIGS. 6A-6F are not a limitation and that the distribution may vary according to the specific needs of each device. That is, there are alterations, permutations, and equivalents, which fall within the scope of the examples given above.

Figure 7:
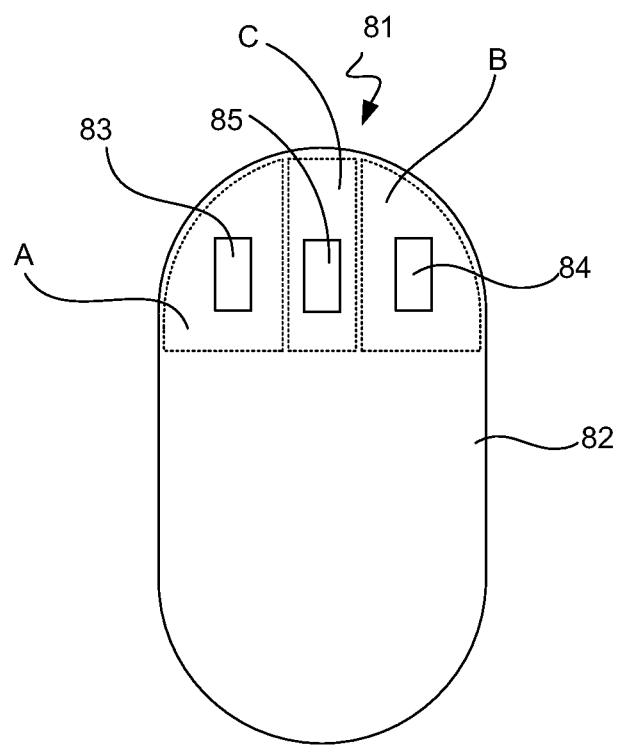
FIG. 7 is a simplified top view of a unibody mouse, in accordance with one embodiment of the present invention.

FIG. 7 is a simplified top view of a unibody mouse 81, in accordance with one embodiment of the present invention. By way of example, the unibody mouse 81 may generally correspond to the unibody mouse shown in FIG. 2, 5 or 6E. The mouse 81 includes three movement indicators—a first switch 83 housed beneath a forward left portion A of a button body 82, a second switch 84 housed beneath a forward left portion B of the body 82 and a third switch 85 housed beneath a forward middle portion C of the body 82. A left tilt clicking action tends to activate the first switch 83, a right clicking action tends to activate the second switch 84 and a middle tilt clicking action tends to activate the third switch 85. The signals sent by the activated switches 83-85 may be controlled, as for example via software, so as to produce one or more button functions. For example, the mouse 81 may be configured to act as a single button mouse when any of the portions A-C are pressed (A-C is equal to a single button zone). The mouse 81 may also be configured to act as a dual button mouse when portions A and B are individually pressed (FIG. 6A), when portions AC and B are individually pressed (FIG. 6C) or when portions A and BC are individually pressed. The mouse 81 may also be configured to act as a triple button mouse when respective portions A, B or C are individually pressed (FIG. 6E), or the like.

Figure 8:
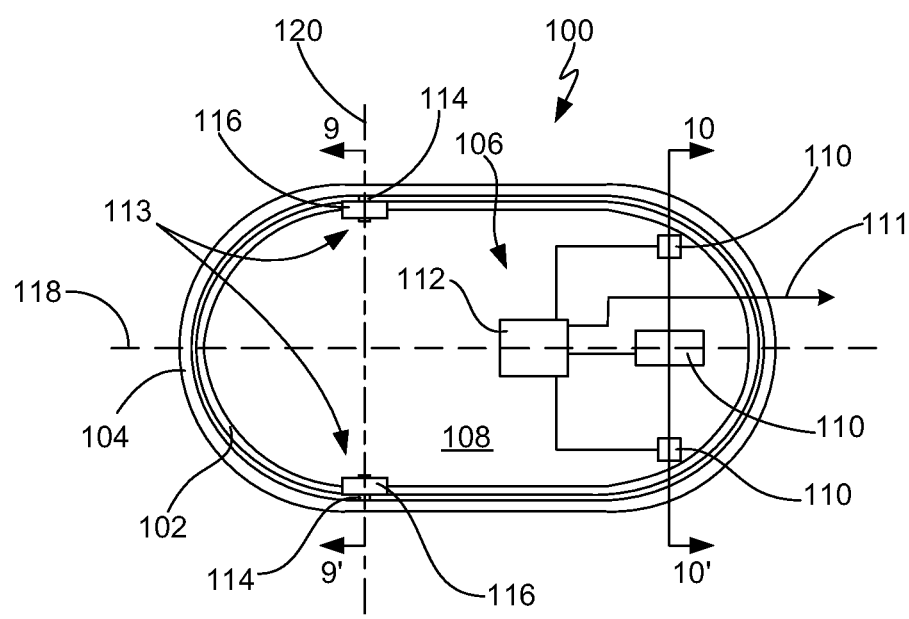
FIG. 8 is a top view, in cross section, of a unibody mouse, in accordance with one embodiment of the present invention.

FIG. 8 is a top elevation view, in cross section, of a mouse 100, in accordance with one embodiment of the present invention. By way of example, the mouse 100 may generally correspond to the mouse 50 shown in FIG. 7. The mouse 100 includes a base 102 and a body 104 that cooperate to enclose a plurality of internal components 106. The internal components may be electrical and/or mechanical components. In the illustrated embodiment, the electrical components include a printed circuit board 108, a plurality of movement indicators 110 and a microcontroller 112. The printed circuit board 108 is attached to the base 102, and the movement indicators 110 and microcontroller 112 are attached to the printed circuit board 108. The movement indicators 110, which may be mechanical, optical or magnetic, provide signals to the microcontroller and the microcontroller provides an output (signal 111) for use by an electronic device. By way of example, the output may be sent via a wired or wireless connection.

The base 102 provides a platform for sliding the mouse 100 along a surface and for supporting different components of the mouse 100, as for example, the internal components 106 and the body 104. In order to provide a clicking action, the body 104 is configured to move relative to the base 102. The clicking action (e.g., the movement of the body 104 relative to the base 102) may be provided through one or more degrees of freedom (DOF). The degrees of freedom may be implemented through one or more rotations, pivots, translations, flexes (and/or the like) relative to the base 102. By way of example, the button body 104 may be coupled to the base 102 via one or more pin joints, slider joints, ball and socket joints, flexure joints and the like. In the illustrated embodiment, the body has at least two degrees of freedom relative to the base so as to allow the body to move in multiple directions. The components used to implement the at least two degrees of freedom DOF may be widely varied.

To elaborate, the body 104 is coupled to the base 102 via a two axis joint 113. The two axis joint 113 is configured to allow the body 104 to move about a longitudinal axis 118 and a latitudinal axis 120. The position of the two axes 118, 120 may be widely varied. For example, the latitudinal axis 120 may be positioned towards the back of the mouse 100 (as shown), in the middle of the mouse 100, or towards the front of the mouse 100. In addition, the longitudinal axis 118 may be positioned in the center of the mouse 100 (as shown), towards the left side of the mouse 100 or towards the right side of the mouse 100. The position of the two axis 118, 120 generally determines the type of clicking actions. In the illustrated embodiment, the axis arrangement produces at least three clicking actions—a right click, a middle click and a left click. With regards to the right click, if the user presses on the right front portion of the body 104, the body 104 tilts forward and to the right. With regards to the left click, if the user presses on the left front portion of the body 104, the body 104 tilts forward and to the left. With regards to the middle click, if the user presses on the middle front portion of the body 104, the body 104 tilts forward.

In one embodiment, the two axis joint 113 is a pivot/flexure joint that includes a pivot and a bendable flexure (e.g., spring). The pivot generally includes a pivot pin that is rotatable within a pivot support. In one example, the pivot pin is coupled to the body 104 and the pivot support 116 is coupled to the base 102 through the bendable flexure. In this example, the pivot allows the body 104 to rotate about the latitudinal axis 120, and the bendable flexure allows the body 104 to pivot about the longitudinal axis 118 (thereby giving the mouse two degrees of freedom).

The moving body 104 provides a platform for actuating the movement indicators 110 disposed underneath the body 104. That is, if a user implements a click, the body tilts forward and to the right, middle or left thereby actuating one or more of the movement indicators 110. When activated, the movement indicators send signals to the controller 112. The controller may process the signals directly or it may pass the signals onto a host device for processing. The processing step is generally configured to produce a control signal corresponding to a right button click when the user presses on the right front portion of the mouse body 104, a left button click when the user presses on the left front portion of the mouse body 104 and a middle button click when the user presses on the middle front portion of the mouse body 104.

Figure 9A:
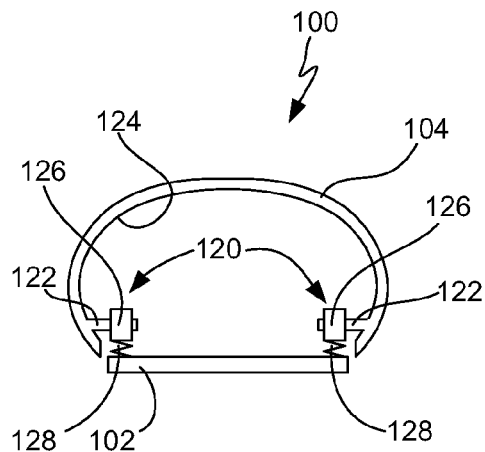
FIGS. 9A-9F are side elevation views, in cross section, of a unibody mouse, in accordance with several embodiments of the present invention.

FIGS. 9A-9F are side views, in cross section, of the mouse 100 (taken along sectional line 9-9' in FIG. 8), in accordance with several embodiments of the invention. Each of the Figures is arranged to show various arrangements for implementing the at least two degrees of freedom DOF. In FIG. 9A, the body 104 is coupled to the base 102 via a pivot/flexure joint 120. The pivot/flexure joint 120 includes a pair of pivot pins 122, which extend from the inner periphery 124 of the body 104 and which engage a pivot support 126. The pivot/flexure joint 120 also includes a flexure 128 that couples the pivot support 126 to the base 102. As should be appreciated, the pivot joint allows the body 104 to pivot forward towards the front of the mouse 100, and the flexure joint allows the body 104 to move to either side of the mouse 100. This combination yields a body 104 that can tilt straight forward, right forward and left forward (or backwards if desired). In one implementation, the flexure is a bendable material such as plastic or metal. In the illustrated embodiment, the flexure is a spring. Any suitable spring may be used.

Figure 9B:
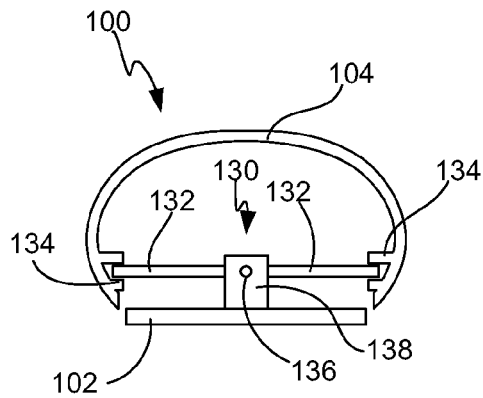

In FIG. 9B, the body 104 is coupled to the base 102 via a double pivot joint 130. The double pivot joint 130 includes an axle 132 which extends across the body 104, and which engages a pair of pivot supports 134 attached to the body 104 (one on each side of the body). The double pivot joint 130 also includes a pivot pin 136, which is coupled to the axle 132, which extends in a direction orthogonal to the axle 132 and which engages a pivot support 138 attached to the base 102. This combination yields a body that can tilt straight forward, right forward and left forward (or backwards if desired). The pivot joints (e.g., pivot pins and pivot supports) may alternatively be provided by ball and socket joints.

Figure 9C:
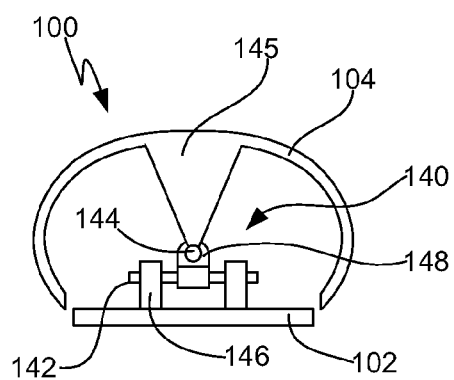

In FIG. 9C, the body 104 is coupled to the base 102 via a double pivot joint 140. The double pivot joint 140 includes first and second pivot pins 142, and 144 that engage first and second pivot supports 146, 148, respectively. The second pivot pin is attached to an extension 145 of the body 104. The first pivot support 146 is mounted to the base 102, and the second pivot support 148 is mounted to the first pivot pin 142. This combination yields a body that can tilt straight forward, right forward and left forward (or backwards if desired). The pivot joints (e.g., pivot pins and pivot supports) may alternatively be provided by ball and socket joints.

Figure 9D:
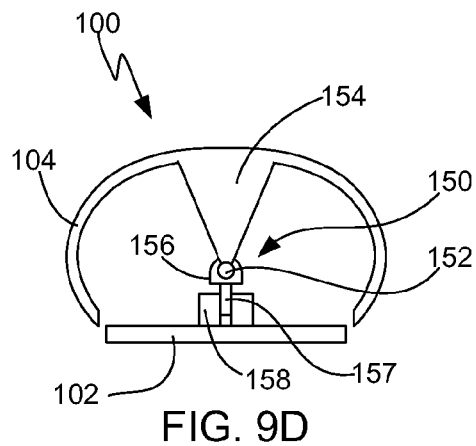

In FIG. 9D, the body 104 is coupled to the base 102 via a pivot slider joint 150. The pivot slider joint 150 includes a pivot pin 152 which is attached to an extension 154 of the body 104 and which engages a pivot support 156. The pivot slider joint 150 also includes a slider 157, which is attached to the pivot support 156 and which engages a slide support 158 that is mounted on the base 102. This combination yields a body that can tilt right and left and translate upwards and downwards.

Figure 9E:
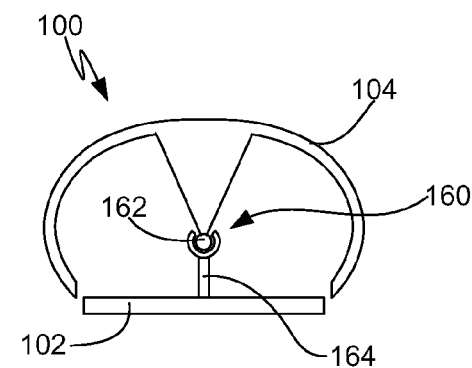

In FIG. 9E, the body 104 is coupled to the base 102 via a ball and socket joint 160. The ball and socket joint 160 includes a ball 162 that is attached the body 104, and a socket 164 that is attached to the base 102. The ball 162 is configured to engage the socket 164 so as to allow the body 104 to swivel relative to the base 102. This combination yields a body 104 that can tilt to almost any point, as for example, forward straight, forward left, forward right, backwards straight, backwards right, backwards left, left, right or any point therebetween.

Figure 9F:
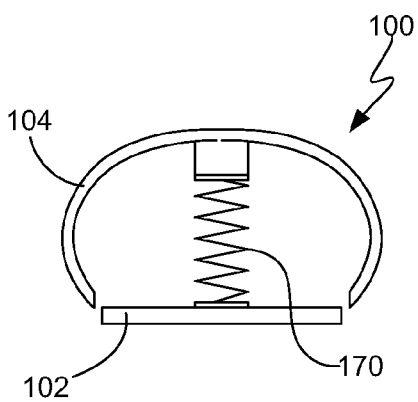

In FIG. 9F, the body 104 is coupled to the base 102 via a flexure 170. The flexure 170, which is bendable, is attached to the body 104 and to the base 102. The bendable nature of the flexure 170 allows the body 104 to tilt to almost any point, as for example, forward straight, forward left, forward right, backwards straight, backwards right, backwards left, left, right or any point therebetween. In one implementation, the flexure is a spring.

It should be noted that the joints shown in FIGS. 9A-9F are not a limitation and that the joints may vary according to the specific needs of each device. That is, there are alterations, permutations, and equivalents, which fall within the scope of the examples given above.

Figure 10A:
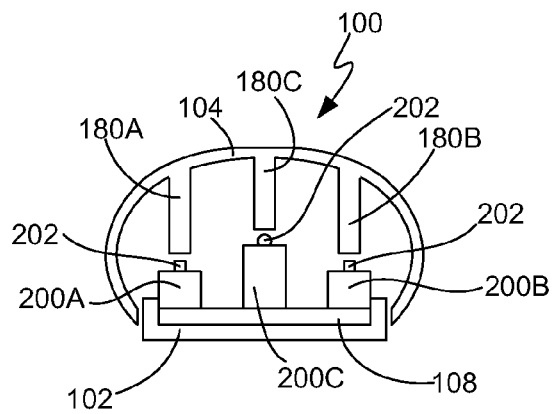
FIGS. 10A-10C are side elevation views, in cross section, of a unibody mouse, in accordance with several embodiments of the present invention.
Figure 10B:
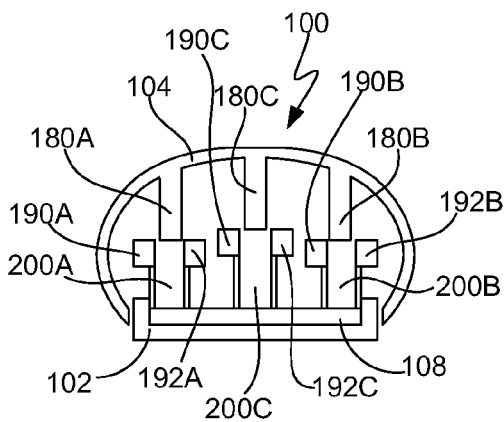
Figure 10C:
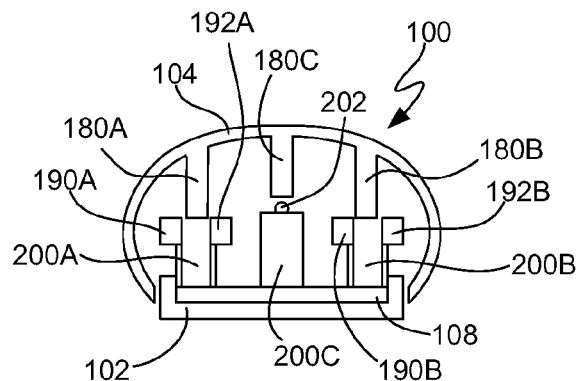

FIGS. 10A-10C are side views, in cross section, of the mouse 100 (taken along sectional line 10-10' in FIG. 8), in accordance with several embodiments of the invention. Each of the Figures is arranged to show various arrangements of the movement indicators. In these Figures, the mouse includes three movement indicators 200 which are mounted on the printed circuit board 108, and three posts 180 which extend from the bottom surface of the body 104. The posts 180 are arranged to engage a corresponding movement indicator 200 when the body 104 is moved from the unclicked position to the clicked position. The movement indicators 200 may be widely varied. For example, any combination of mechanical, optical (e.g., photo-interrupters) or magnetic (e.g., hall effect) switches may be used.

In FIG. 10A, the mouse 100 includes three mechanical switches 200A-C. The mechanical switches generally include an actuator element 202 configured to receive the corresponding post 180 when the body 104 is moved to the clicked position (e.g., when a downward force is applied to the body 102). In the clicked position, the post 180 is configured to push against the actuator element 202 so as to activate the switch. For example, when a user presses on the left side of the body 104, the left post 180A pushes against the actuator element 202 of the left switch 200A thereby activating the left switch 200A. The actuator element typically moves between a deactivated position (e.g., upright) and an activated position (e.g., depressed). In most cases, the actuator element is spring biased in the deactivated position. The mechanical switches may be widely varied. For example, because the left and middle switches may be activated at the same when the user presses on the left side of the body, the mechanical switches may be configured to have actuator elements that activate with or without a clicking characteristics (e.g., feel or noise). As should be appreciated, a dual clicking feel when only a single clicking feel is suppose to be felt is generally undesirable to the user. In one implementation, therefore, the middle switch provides clicking characteristics while the left and right switches provide no clicking characteristics.

In FIG. 10B, the mouse 100 includes three optical switches 200A-C. Optical switches are similar to mechanical switches in that they have an activate and deactivate condition. Optical switches generally include a light source 190 and a light detector 192 for sensing light from the light source 190. Activation may occur when the detector 192 senses light or when it doesn't sense light. In the illustrated embodiment, activation occurs when the detector 192 does not sense light. The posts 180 are configured to block the light from the light source 190 when the body 104 is moved to the clicked position (e.g., when a downward force is applied to the body 102). In the clicked position, the post 180 is configured to be inserted between the light source 190 and the light detector 192 thereby blocking the light from reaching the detectors 192. For example, when a user presses on the left side of the body 104, the left post 180A moves between the light source 190A and the light detector 192A of the left optical switch 200A thereby activating the switch. Depending on the geometry of the mouse, the middle post may also engage the its optical switch when the user presses on the left side of the body. The manner in which these signals are differentiated may be implemented via software (e.g., when the left and middle are actuated, a left click signal may be implemented in the electronic system).

In FIG. 10C, the mouse includes an arrangement of mechanical and optical switches. In the illustrated embodiment, the mouse 100 includes one mechanical switch 200C and two optical switches 200A and B. The mechanical switch is positioned in the middle, and the optical switches are positioned to the sides.

It should be noted that using three switches is not a limitation and that the number of switches may vary according to the specific needs of each device. For example, two or more switches may be used. The number of switches generally depends on the number of button functionalities available by the mouse.

Figure 11A:
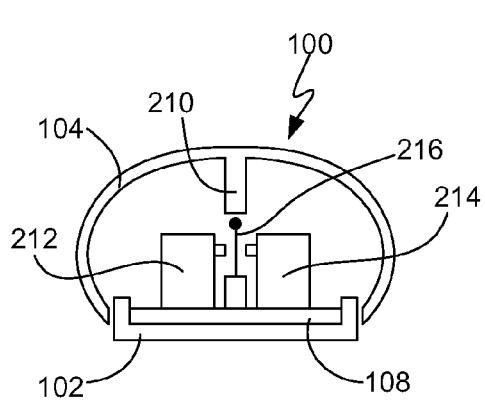
FIGS. 11A-11B are side elevation views, in cross section, of a unibody mouse, in accordance with one embodiment of the present invention.
Figure 11B:
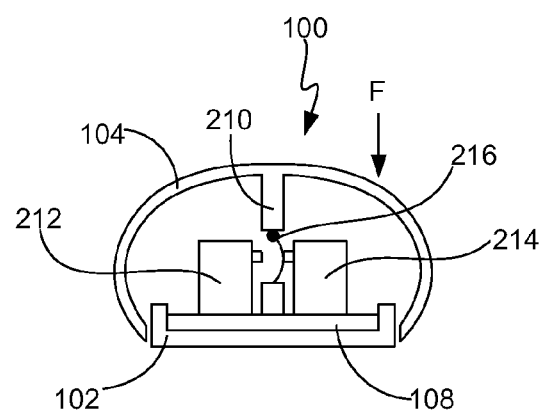

FIGS. 11A-11B are side views, in cross section, of the mouse 100 (taken along sectional line 10-10' in FIG. 8), in accordance with an alternate embodiment of the present invention. In this embodiment, the mouse 100 includes a post 210, a first switch 212, a second switch 214, and a flexure 216. The post 210, which extends from the body 104, is configured to engage the flexure 216 when the body 104 is moved from a first position (as shown in FIG. 11A) to a second position (as shown in FIG. 11B). The flexure 216, which is attached to the base 102, is configured to bend so as to engage one of the switches 212, 214 when the post 210 moves between the first and second positions. For example, as shown in FIG. 11B, when a force F is applied to the right side of the body 104, the flexure 216 bends outward to the right, thus engaging and subsequently moving an actuator element of the second switch 214. In a similar manner (although not shown), when a force is applied to the left side of the body 104, the flexure 216 bends outward to the left, thus engaging and subsequently moving an actuator element of the first switch 212. This particular arrangement may be widely varied. For example, it may be used as shown to produce a mouse with two button functionality, or it may be used in combination to produce more than two button functionalities.

Moreover, it should be noted that sensors may be used in place of switches. Unlike switches, which provide binary data (e.g., activate and deactivate), sensors generally provide continuous data (e.g., they measure a continuous analog value). As such, they may produce uniform force and travel profiles with respect to the clicking actions. Furthermore, they may be used to calibrate out manufacturing discrepancies.

Figure 12:
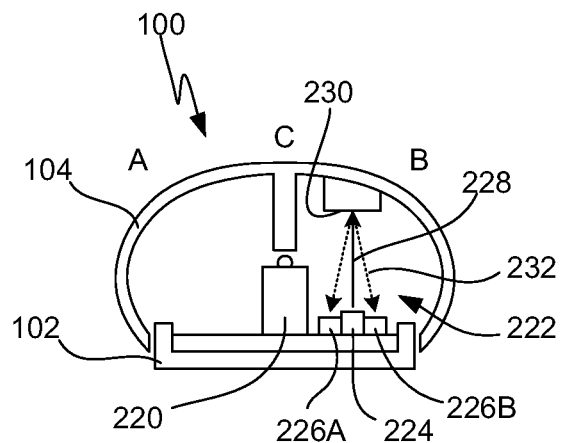
FIG. 12 is a side elevation view, in cross section, of a unibody mouse, in accordance with an alternate embodiment of the invention.

FIG. 12 is side view, in cross section, of the mouse 100 (taken along sectional line 10-10' in FIG. 8), in accordance with an alternate embodiment of the invention. In this embodiment, a switch 220 and a tilt sensor 222 are used to produce signals associated with when the button zones A, B and C are actuated. The switch 220 is configured to activate or deactivate the clicking actions, and the tilt sensor 222 is configured to measure the degree of tilt of the body 104 so as to determine a right, middle or left clicking action. As shown, the tilt sensor 222 includes a light emitter 224 and a plurality of light detectors 226. The light emitter 224 is configured to shine a light beam 228 incident on a reflective surface 230 of the body 104. The light detectors 226 are configured to measure the light intensity of the light 232 that is reflected off of the reflective surface 230. The tilt sensor 222 may be widely varied. In the illustrated embodiment, the tilt sensor 222 includes a pair of light detectors 226A and 226B that are positioned on opposite sides of the light emitter 224. The tilt angle may be determined by the intensity of light that is reflected on each of the detectors 224. In simple terms, if the light intensity on detector 226A is greater than on detector 226B, then the body 104 is tilted to the right, and if the light intensity on detector 226A is less than on detector 226B, then the body 104 is tilted to the left. In most cases, the detectors produce signals that report voltage based on the amount of tilt.

It should be noted that a pair of detectors is not a limitation and that one or more detectors may be used. In one implementation, two pairs of detectors, which are positioned orthogonal to each other are used to determine tilt in multiple directions.

Figure 13A:
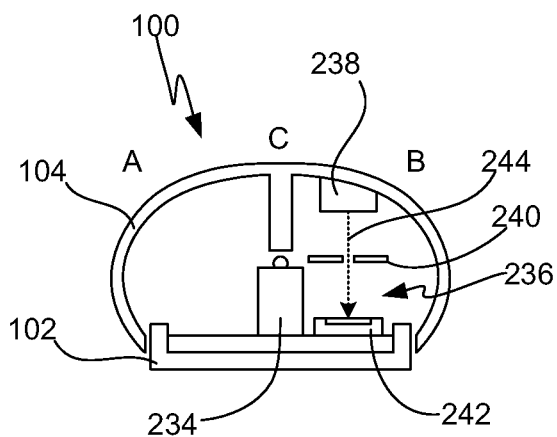
FIGS. 13A-13C are side elevation views, in cross section, of a unibody mouse, in accordance with one embodiment of the present invention.
Figure 13B:
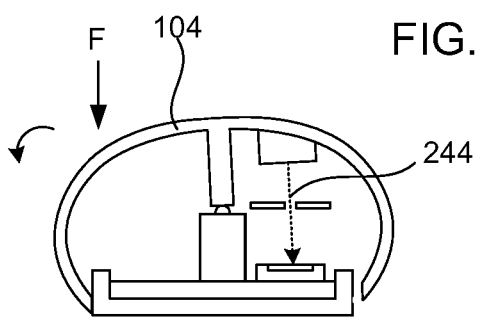
Figure 13C:
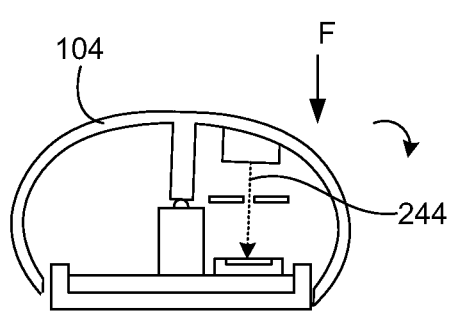

FIG. 13A is a side view, in cross section, of the mouse 100 (taken along sectional line 10-10' in FIG. 8), in accordance with an alternate embodiment of the invention. In this embodiment, a switch 234 and a tilt sensor 236 are used to produce signals associated with when the button zones A, B and C are actuated. The switch 234 is configured to activate or deactivate the clicking actions, and the tilt sensor 236 is configured to measure the degree of tilt of the body 104 so as to determine a right, middle or left clicking action. As shown, the tilt sensor 236 includes a light emitter 238, a collimator 240 and a position sensitive detector array 242. The light emitter 238 (e.g., I-R emitter diode) is configured to shine a light beam 244 incident on the position sensitive detector array 242. The collimator 240 is configured to help focus the light 244 on the detector array 242. The position sensitive detector array 242 is configured to measure the position of the light 244 incident on the detector array 242. In simple terms, if the light 244 is detected on the left detectors of the detector array 242, then the body 104 is tilted to the right (as shown in FIG. 13C), and if the light 244 is detected on the right detectors of the detector array 242, then the body 104 is tilted to the left (as shown by FIG. 13B).

Figure 14:
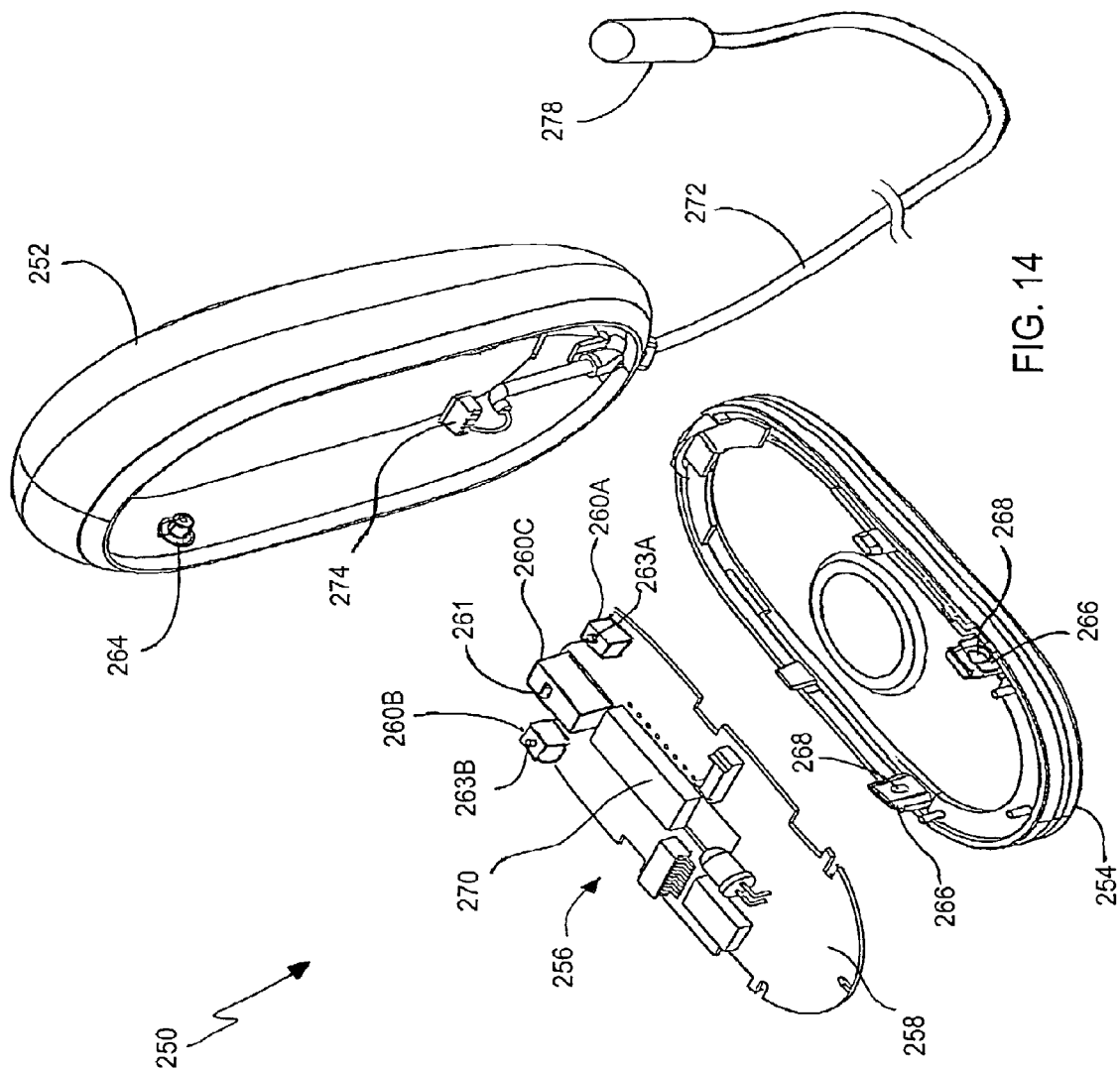
FIG. 14 is a perspective view of a unibody mouse, in accordance with one embodiment of the invention.

FIG. 14 is a broken away perspective diagram of a unibody mouse 250, in accordance with one embodiment of the present invention. By way of example, the unibody mouse may correspond to the mouse shown in FIG. 8. The mouse 250 includes a body 252 and a base 254. The base 254 and body 252 are configured to enclose a plurality of electrical components 256. The electrical components 256, which are supported by the base 254, include at least a printed circuit board 258 having a plurality of switches 260 attached thereto. The base 254 and body 252 are also configured to provide a clicking action. Broadly, the clicking action is provided by a pivot flexure joint that allows the body to move in multiple directions (e.g. multiple DOF). For example, the body may be capable of tilting to the left-front, right-front or middle-front of the mouse.

More specifically, the body 252 is pivotally coupled to the base 254 via a pair of pivot pins 264, which extend from the body 252 and which are located towards the rear of the body 252. The pivot pins 264 are configured to be coupled to a pair of flexure supports 266 which are flexibly attached to the base 254, and which are located towards the rear of the base 254. The pivot pins 264 are adapted to be inserted into openings 268 in the flexure support 266 thereby allowing the body 252 to pivot relative to the base 254. The flexure support 266 is formed from a bendable or deformable material that allows the body 252 to move in multiple directions (e.g., side to side). For example, the flexure support may be formed from plastic, metal and the like. The flexure support may be mounted on the base 254 or it may be part of the base 254. In the illustrated embodiment, the flexure support 266 and base 254 are integrated into one unit (e.g., the flexure support is formed into the base).

As should be appreciated, the pivot allows the body 252 to swing between an unclicked position, placing the body 252 in an upright position, and a front clicked position, tilting the body 252 towards the front of the mouse 250. In addition, the flexure allows the body to swing between an unclicked position, placing the body 252 in an upright position, and a left or right clicked position, tilting the body 252 to the right and left sides of the mouse 250. In one embodiment, a spring mechanism is used to bias the body 252 in a direction away from the base 254, i.e., in the un-clicked positions. By way of example, the spring mechanism may be part of the switches 260, i.e., the actuators may be biased in the upright position, or it may be a separate spring pad connected to the base 254. In the illustrated embodiment, the spring mechanism is part of the middle switch 260C, and thus the actuator 261 of the switch 260C is configured to push against an inner surface of the body 254 so as to bias the body in the unclicked position.

In the right clicked position (e.g., when a downward force is applied to the right front side of the body 252), the body 252 is configured to engage the right switch 260A. That is, during the clicking action, a bottom portion of the body is pushed against the actuator 263A of the sensor 260A thereby activating the switch 260A. In the left clicked position (e.g., when a downward force is applied to the left front side of the body 252), the body 252 is configured to engage the left sensor 260B. That is, during the clicking action, a bottom portion of the body is pushed against the actuator 263B of the switch 260B thereby activating the sensor 263B. In the middle clicked position (e.g., when a downward force is applied to the middle front side of the body 252), the body 252 is configured to engage the switch 260C. That is, during the clicking action, a bottom portion of the body is pushed against the actuator 261 of the switch 260C thereby activating the switch 260C. Although FIG. 14 is directed towards switches, it should be noted that sensors may also be used.

When the switches are activated, one or more signals are provided to a host device such as a computer. In one implementation, the signals are first processed by a processor chip 270, which is positioned on the PCB 258. The processor chip 270 is typically configured to turn the signals into data, which can be used by a computer. The data signals may be sent through a cable 272 that is connected to the processor chip 270. One end of the cable 272 typically includes a connector 278 for temporarily coupling the mouse 250 to the computer. By way of example, the connector 278 may be a PS/2 connector, a serial connector, a USB connector and the like.

Although the switches are configured to report three states: right click, left click, and middle click, the mouse itself may be configured to provide one or more button functions. For example, the mouse may be configured to provide a single button function, two button functions, three button functions and the like. In the case of single button functionality, the three states may all correspond to the same button function. That is, no matter which click is used: right click, left click and middle click, the mouse implements a single button function. In the case of dual button functionality, a portion of the three states may correspond to the same button function and a portion may correspond to a different button function. For example, a right click and a middle click may correspond to a first button function, and the left click may correspond to a second button function. In addition, a left click and a middle click may correspond to a first button function, and the right click may correspond to a second button function. Moreover, a right click and a left click may correspond to a first button function, and the middle click may correspond to a second button function. In the case of three button functionality, the three states may correspond to different button functions. For example, a right click may correspond to a first button function, a middle click may correspond to a second button function and a left click may correspond to a third button function.

In one embodiment, the signal interpretation is implemented at the mouse. In another embodiment, the signal interpretation is implemented by the host device to which the mouse is connected. In this embodiment, the signal interpretation may be implemented via software, as for example, the operating system (OS) of the host device using the mouse. For example, with regards to a two button mouse, the OS may decide whether the middle click should be associated with a left or right click.

The manner in which the host device (computer) interprets the signals may be widely varied. In one embodiment, the host device is configured to interpret the signals so as to produce a single button mouse. For example, the host device may be configured to provide a single button function when any of the three states are activated (together or separately). In another embodiment, the host device is configured to interpret the signals so as to produce a dual button mouse. For example, the host device may be configured to provide two button functions when specific states are activated (together or separately). In yet another embodiment, the host device is configured to interpret the signals so as to produce a three button mouse. For example, the host device may be configured to provide three button functions when specific states are activated (separately).

In one implementation, the signal interpretation is programmable so as to allow a user to control the type and number of button functions implemented by the mouse. For example, if a user wants a two button mouse, the middle clicking actions can be reported as either right or left clicks. This allows the mouse clicking to be slightly customized by the user so as to better match the desires of the user. For example, a right handed user may want to configure the mouse differently than a left handed user. In addition, once a user increases their skills, they may want to add more functionality to the mouse. In one embodiment, a control panel may be used to allow a user to program the functionality of the mouse. For example, the control panel may include enable/ disable selections, or specific configurations such as a two button mouse with right and left click selections or front and back click selections.

Figure 15:
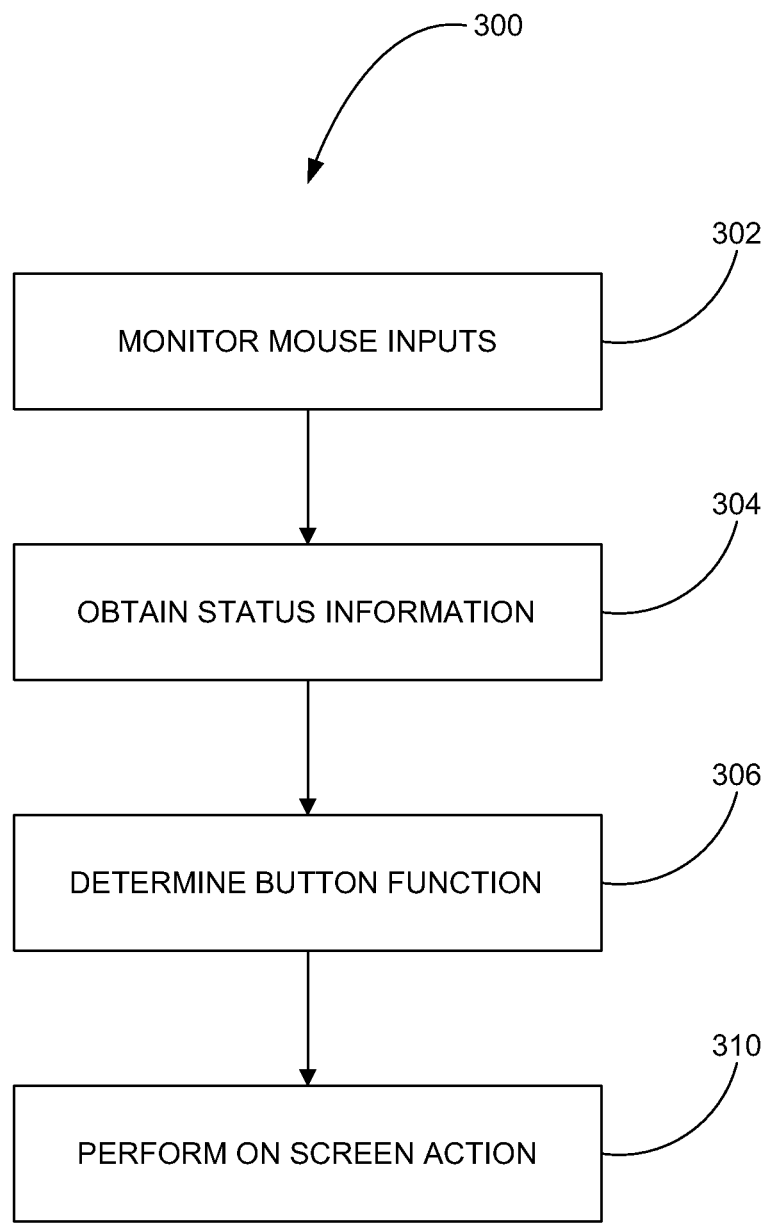
FIG. 15 is a flow diagram of mouse processing, in accordance with one embodiment of the present invention.

FIG. 15 is a flow diagram of mouse processing 300, in accordance with one embodiment of the invention. The mouse processing 300 is generally performed by a computer system (or computer) to provide the computer system with one or more button functionalities. In one embodiment, the computer system corresponds to a general purpose computer such as an IBM compatible computer or Apple computers.

The mouse processing 300 generally begins at block 302 where inputs from a mouse are monitored. Here, one or more states associated with the mouse can be monitored. By way of example, the states being monitored can include clicking actions such as right click, left click and middle click. After block 302, the process proceeds to block 304 where status information associated with the states are obtained from the monitoring. By way of example, the status information may correspond to which of the states are activated (e.g., on or off).

After block 304, the process proceeds to block 306 where button functions of the mouse are determined. The button functionalities are generally based on the status information and predetermined configuration information. In one embodiment, the predetermined configuration information identifies a type and nature of button function that is to be provided for a specific status information. By way of example, an on screen action such as selecting an item on the screen may be identified when a left click status is activated, and a right and middle click status is not activated. In one embodiment, the predetermined configuration information is stored in memory. Thus, the computer consults the information held in memory in order to determine the on-screen action for a specific clicking action. The predetermined configuration information stored in the memory may be accessed by a user through a mouse control menu, which may be viewed on a display screen as part of a GUI interface. The mouse control menu may include control settings pertaining to one or more on screen actions. In fact, the mouse control menu may serve as a control panel for reviewing and/or customizing the mouse control settings, i.e., the user may quickly and conveniently review the mouse control settings and make changes thereto. Once the user saves the changes, the modified mouse control settings will be employed (e.g., as predetermined configuration information) to handle future events transmitted and/or received through the computer.

After the button functions have been determined, the process proceeds to block 310 where appropriate button functions are used to perform the on screen action. For example, the on screen actions may select an item on the screen, open a file or document, execute instructions, start a program, view a list of commands (or system properties), or the like. Thereafter, the process can proceed to back to block 302 where mouse inputs are monitored.

While this invention has been described in terms of several preferred embodiments, there are alterations, permutations, and equivalents, which fall within the scope of this invention. For example, the mouse may include an adjustable tensioner to stiffen the ease of the clicking action, i.e., the tension may be lowered to accommodate smaller and lighter hands and increased to accommodate larger and heavier hands. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A method of configuring a uni-body multi-function input device by a user, the uni-body input device having a single housing component, the method comprising:
    selecting a location from any portion of a surface of the single housing component; assigning a distinct input zone to the selected location of the surface of the single housing component;
    generating a signal from an assigned input zone by actuating an associated indicator configured to sense a user input event at the associated assigned input zone;
    interpreting the signal received from the associated assigned input zone as a corresponding input function; and
    performing the input function corresponding to the signal received from the multi-function input device.

2. The method as recited in claim 1, further comprising: connecting the multi-function input device to a computer having a display screen arranged to display an image and a processor unit operatively coupled to the display screen, wherein the processor unit receives and interprets the signal received from the multi-function input device.

3. The method as recited in claim 2, wherein the input function is selected from a group comprising: a single click function, a double click function, and/or a dragging and dropping function.

4. The method as recited in claim 3, wherein the single click function causes the computer to select a particular image on the display screen, and wherein the double click function causes the computer to open a document and/or launch a program, and wherein the dragging and dropping function generally causes the computer to move an item on the display screen in accordance with movement of the multi-function input device in relation to a surface.

5. The method as recited in claim 1, wherein the user input event sensed by the indicator is a user applying pressure to the single housing component at the assigned input zone.

6. The method as recited in claim 5, wherein input function corresponding to user applied pressure to the single housing component is a clicking action.

7. A unibody input device, comprising:
    a single housing component enclosing all the electrical components of the unibody input device, wherein when a user selects any location on a surface of the single housing component as an assignable input zone, the assignable input zone is configured to incorporate user programmable multiple input functionalities, wherein a user implements a selected input functionality by providing a user input event at the corresponding input zone; and
    a sensor arranged to sense the user input event at the single housing component, and based upon the location of the user event generate a signal corresponding to the input functionality associated with the activated input zone.

8. The unibody input device as recited in claim 7, further comprising: an interface arranged to provide a communication channel between at least the sensor and a computing device other than the unibody input device, wherein the computing device receives and interprets the signal received from the sensor.

9. The unibody input device as recited in claim 8, wherein when the unibody input device is user programmable, then the interpreting the signal received from the sensor updated to correspond to an updated user provided function.

10. The unibody input device as recited in claim 9, wherein the input function is selected from a group comprising: a single click function, a double click function, and/or a dragging and dropping function.

11. The unibody input device as recited in claim 10, wherein the single click function causes the computing device to select a particular image on a display screen, and wherein the double click function causes the computing device to open a document and/or launch a program, and wherein the dragging and dropping function generally causes the computing device to move an item on the display screen in accordance with movement of the unibody input device in relation to a surface.

12. The unibody input device as recited in claim 7, wherein the user input event is sensed by the sensor is the user applying pressure to the single housing component at the assigned input zone.

13. The unibody input device as recited in claim 12, wherein input function corresponding to user applied pressure to the single housing component is a clicking action.

14. The computer program product as recited in claim 13, wherein the user input event sensed by the indicator is a user applying pressure to the single housing component at the assigned input zone.

15. A computer program product storing instructions executable by a processor for configuring a uni-body multi-function input device by a user, the uni-body input device having a single housing component, comprising:
- a first set of instructions, stored in at least one non-transitory machine readable medium, executable by at least one processing unit to select a location from any portion of a surface of the single housing component;
- a second set of instructions, stored in the at least one non-transitory machine readable medium, executable by the at least one processing unit to assign a distinct input zone to the selected location of the surface of the single housing component;
- a third set of instructions, stored in the at least one non-transitory machine readable medium, executable by the at least one processing unit to generate a signal from an assigned input zone by actuating an associated indicator configured to sense a user input event at the associated assigned input zone;
- a fourth set of instructions, stored in the at least one non-transitory machine readable medium, executable by the at least one processing unit to interpret the signal received from the associated assigned input zone as a corresponding input function; and
- a fifth set of instructions, stored in the at least one non-transitory machine readable medium, executable by the at least one processing unit to perform the input function corresponding to the signal received from the multi-function input device.

16. The computer program product as recited in claim 15, further comprising: a fifth set of instructions, stored in the at least one non-transitory machine readable medium, executable by the at least one processing unit to connect the multi-function input device to a computer having a display screen arranged to display an image and a processor unit operatively coupled to the display screen, wherein the processor unit receives and interprets the signal received from the multi-function input device.

17. The computer program product as recited in claim 16, wherein the input function is selected from a group comprising: a single click function, a double click function, and/or a dragging and dropping function.

18. The computer program product as recited in claim 17, wherein the single click function causes the computer to select a particular image on the display screen, and wherein the double click function causes the computer to open a document and/or launch a program, and wherein the dragging and dropping function generally causes the computer to move an item on the display screen in accordance with movement of the multi-function input device in relation to a surface.

19. The computer program product as recited in claim 16, wherein uni-body multi-function input device is utilizable by the user to at least one of move an indicator displayed by the computer on the display screen or make selections with respect to a graphical interface displayed by the computer on the display screen.

20. The computer program product as recited in claim 16, wherein input function corresponding to user applied pressure to the single housing component is a clicking action.

* * * * *